United States Patent [19]
Baer et al.

[11] Patent Number: 5,771,746
[45] Date of Patent: Jun. 30, 1998

[54] INTERLOCK ASSEMBLY FOR VEHICLE TRANSMISSION

[75] Inventors: Kurt R. Baer; John M. Loeffler, both of Toledo; George A. Willford, Waterville; Timothy R. Zuehlke, Toledo, all of Ohio

[73] Assignee: Dana Corporation, Toledo, Ohio

[21] Appl. No.: 783,313

[22] Filed: Jan. 15, 1997

[51] Int. Cl.$^6$ .................................................... F16H 63/36
[52] U.S. Cl. ..................................... 74/473.25; 74/473.11
[58] Field of Search ............................ 74/483 R, 473.25, 74/473.24, 473.21, 483 PB

[56] References Cited

U.S. PATENT DOCUMENTS

| | | | |
|---|---|---|---|
| 1,434,643 | 11/1922 | Woolson | 74/473.24 |
| 1,537,584 | 5/1925 | Carhart . | |
| 1,564,719 | 12/1925 | Sponable | 74/473.24 |
| 1,601,048 | 9/1926 | Sponable . | |
| 1,912,936 | 6/1933 | Fawick | 74/473.24 |
| 4,633,729 | 1/1987 | Scalisi et al. . | |
| 4,633,730 | 1/1987 | Scalisi et al. . | |
| 4,726,250 | 2/1988 | Reed, Jr. | 74/473.24 |
| 4,800,772 | 1/1989 | Irlbacher et al. . | |
| 5,394,765 | 3/1995 | Ono et al. . | |
| 5,450,767 | 9/1995 | Willford et al. . | |

*Primary Examiner*—Charles A. Marmor
*Assistant Examiner*—William C. Joyce
*Attorney, Agent, or Firm*—MacMillan, Sobanski & Todd, LLC.

[57] ABSTRACT

An interlock assembly for a vehicle transmission prevents more than one of a plurality of shift rails from being simultaneously moved axially out of a central neutral position to a gear engaging position. The interlock assembly includes an interlock plate having four semi-circular cut-outs (one for each of the shift rails) and two relative large interior openings. The interlock assembly further includes a backing plate which is somewhat smaller than the interlock plate and has two relatively small interior openings. A pair of threaded fasteners extend through the small openings of the backing plate and through respective spacer bushings disposed in the large interior openings of the interlock plate into threaded engagement with the housing of the hydraulic actuator. The spacer bushings prevent the interlock plate from being frictionally engaged between the backing plate and the housing of the hydraulic actuator. As a result, the interlock plate is loosely supported on the threaded fasteners and can slide freely in any direction relative thereto. Each of the four cut-outs of the interlock plate is formed having opposed tapered edges which cooperate with tapered grooves formed on the exterior surfaces of the four shift rails. When any one of the four shift rails is moved out of the central neutral position, the interlock plate slides to extend into the grooves of the other three shift rails. Thus, the interlock plate prevents the other shift rails from moving until all are in the central neutral position.

18 Claims, 5 Drawing Sheets

INTERLOCK ASSEMBLY FOR VEHICLE TRANSMISSION

BACKGROUND OF THE INVENTION

This invention relates in general to vehicle transmissions and in particular to an improved structure for an interlock assembly for preventing more than one shift rail in such a vehicle transmission from being shifted out of a neutral position at any given time.

In most vehicles, a transmission is provided in the drive train between the engine and the driven wheels. As is well known, the transmission includes a case containing an input shaft, an output shaft, and a plurality of meshing gears. Means are provided for connecting selected ones of the meshing gears between the input shaft and the output shaft to provide a desired speed reduction gear ratio therebetween. The meshing gears contained within the transmission case are of varying size so as to provide a plurality of such gear ratios. By appropriately shifting among these various gear ratios, acceleration and deceleration of the vehicle can be accomplished in a smooth and efficient manner.

The shifting of the transmission among the available gear ratios is frequently accomplished manually, wherein the selection and engagement of a specific gear ratio is performed in response to some physical exertion by the vehicle driver. Most commonly, the driver grasps and physically moves an upper portion of an elongated shift lever to initiate the selection and engagement of a gear ratio. In response thereto, a lower portion of the shift lever engages and moves one of a plurality of shift rails provided within the transmission. Movement of the selected shift rail causes certain ones of the meshing gears to be connected between the input shaft and the output shaft so as to provide the desired gear ratio therebetween. Manually shifted transmissions are desirable because they are relatively simple, inexpensive, and lightweight in structure and operation. Because of this, the majority of medium and heavy duty truck transmissions in common use today are manually shifted transmissions.

In order to improve the convenience of use of manually shifted transmissions, various structures have been proposed for partially or fully automating the shifting thereof. In a partially automated manual transmission, the driver-manipulated shift lever engages and moves certain ones of the shift rails, while an automatic shifting mechanism (which may be hydraulically or pneumatically actuated) engages and moves the remaining shift rails. For example, the lower gear ratios of a partially automated manual transmission may be manually selected and engaged by the vehicle driver using the shift lever, while the higher gear ratios are automatically selected and engaged by the automatic shifting mechanism. In a fully automated manual transmission, the driver-operated shift lever is usually replaced by the automatic shifting mechanism. The automatic shifting mechanism functions to shift all of the shift rails within the transmission throughout all of the available gear ratios. A partially automated manual transmission is advantageous, particularly in long haul and similar trucking applications, because it is lower in cost than a comparable fully automated manual transmission, yet offers automatic shifting in the higher gear ratios where the majority of shifting between gears normally occurs.

In both of these types of transmissions, the shift rails are typically embodied as elongated members which are supported in a spaced apart and parallel manner within the transmission case. Each of the shift rails is usually movable from a central neutral position either axially forwardly to a first gear engaging position or axially rearwardly to a second gear engaging position. Thus, for example, a transmission having four shift rails is capable of selecting a total of eight different gear ratios (usually seven forward gear ratios and one reverse gear ratio). In order to prevent damage from occurring to the transmission during use, it is important that only a single one of the shift rails be moved out of the neutral position at any given time.

To accomplish this, it is known to provide the transmission with an interlock mechanism which is responsive to movement of one of the shift rails out of the neutral position to positively maintain all of the other shift rails in the neutral position. A wide variety of such interlock mechanisms are known in the art. In many instances, the interlock mechanism is connected to the shift lever for movement therewith. However, in the fully automated manual transmissions described above, no shift lever is typically provided. In other transmissions, the interlock mechanism is directly responsive to movement of the shift rails. Unfortunately, known interlock mechanisms of this type are relatively complicated and expensive. Thus, it would be desirable to provide an improved structure for an interlock mechanism for a vehicle transmission which is suited for use with both manual and automatic transmissions, and further which is simple and inexpensive in structure and operation.

SUMMARY OF THE INVENTION

This invention relates to an improved structure for an interlock assembly for a vehicle transmission which is adapted to prevent more than one of a plurality of shift rails from being simultaneously moved axially out of a central neutral position to a gear engaging position. The interlock assembly includes an interlock plate having four semi-circular cut-outs (one for each of the shift rails) and two relative large interior openings. The interlock assembly further includes a backing plate which is somewhat smaller than the interlock plate and has two relatively small interior openings. A pair of threaded fasteners extend through the small openings of the backing plate and through respective spacer bushings disposed in the large interior openings of the interlock plate into threaded engagement with the housing of the hydraulic actuator. The spacer bushings prevent the interlock plate from being frictionally engaged between the backing plate and the housing of the hydraulic actuator. As a result, the interlock plate is loosely supported on the threaded fasteners and can slide freely in any direction relative thereto. Each of the four cut-outs of the interlock plate is formed having opposed tapered edges which cooperate with tapered grooves formed on the exterior surfaces of the four shift rails. When any one of the four shift rails is moved out of the central neutral position, the interlock plate slides to extend into the grooves of the other three shift rails. Thus, the interlock plate prevents the other shift rails from moving until all are in the central neutral position.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
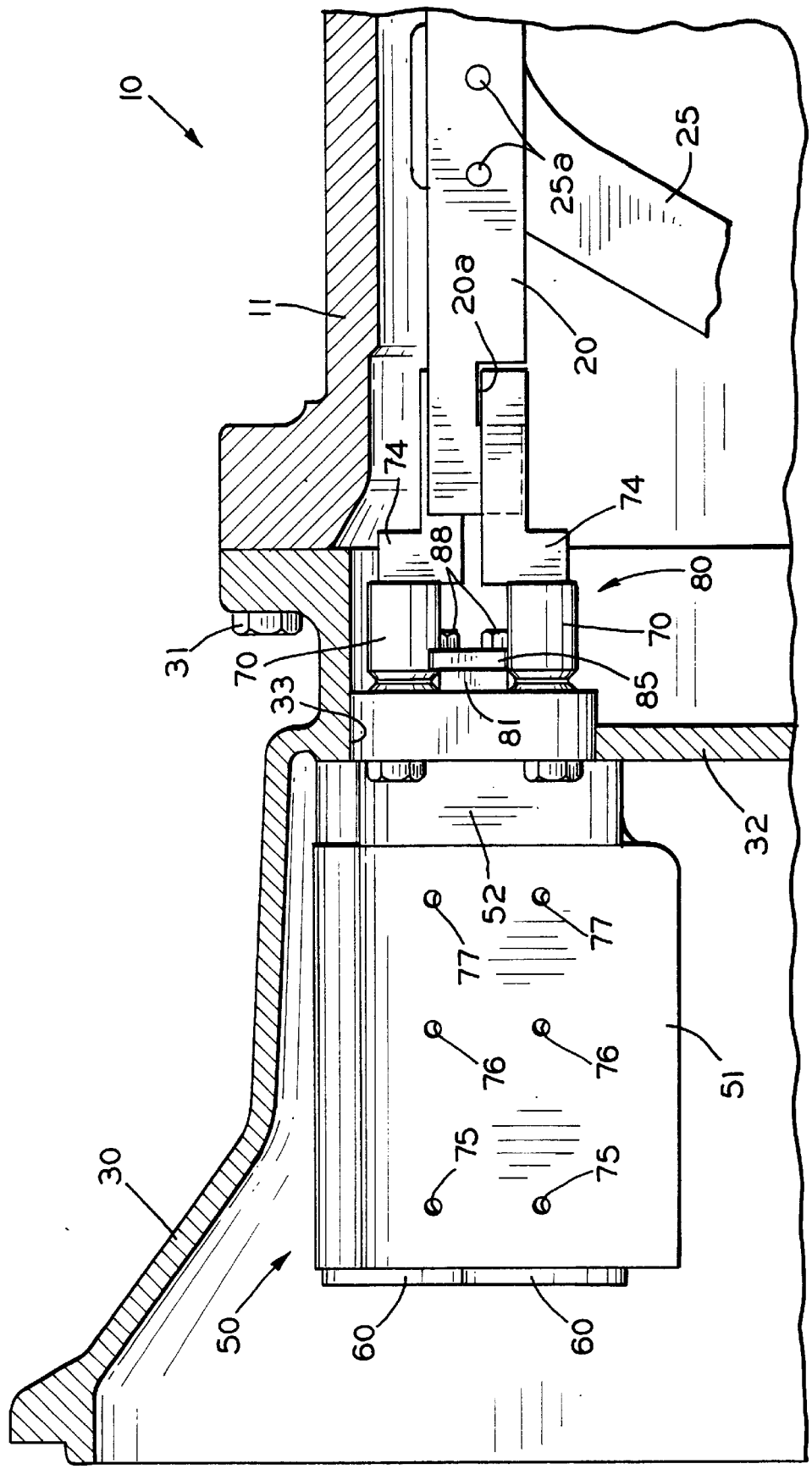
FIG. 1 is a sectional elevational view of a portion of a vehicle transmission including a shift cylinder assembly and interlock mechanism in accordance with this invention.

Referring now to the drawings, there is illustrated in FIG. 1 a portion of a vehicle transmission, indicated generally at 10, in accordance with this invention. The transmission 10 includes a case 11 which encloses a number of non-illustrated components, including an input shaft, an output shaft, a plurality of meshing gears, and means for connecting selected ones of the meshing gears between the input shaft and the output shaft. These non-illustrated components are so well known in the art that a discussion thereof is not necessary for a full and complete understanding of the invention. The meshing gears contained within the transmission case 11 are of varying size so as to provide a plurality of gear ratios. By appropriately shifting among these various gear ratios, acceleration and deceleration of the vehicle can be accomplished in a smooth and efficient manner.

A plurality of elongated shift rails 20, 21, 22, and 23 (see FIG. 2) are provided within the case 11 of the transmission 10. The shift rails 20, 21, 22, and 23 are supported in parallel fashion within the transmission case 11 in a conventional manner. Each of the shift rails 20, 21, 22, and 23 is longitudinally movable from a central neutral position to either a forward position (to the left when viewing FIG. 1) to engage a first gear ratio, or to a rearward position (toward the right when viewing FIG. 1) to engage a second gear ratio. The manner in which the shift rails 20, 21, 22, and 23 are moved will be explained below. The forward ends of the shift rails 20, 21, 22, and 23 have respective notches 20a, 21a, 22a, and 23a formed therein. The notches 20a and 22a are formed in the lower surfaces of the shift rails 20a and 22a, while the notches 21a and 23a are formed in the upper surfaces of the shift rails 21a and 23a. The purposes for these notches 20a, 21a, 22a, and 23a will be explained below.

A first shift fork 25 is connected to the first shift rail 20 by rivets 25a or other conventional means for movement therewith. Similarly, second, third, and fourth shift forks (not shown) are respectively connected to the second, third, and fourth shift rails 21, 22, and 23. The shift forks 25 extend downwardly from their associated shift rails 20, 21, 22, and 23 into engagement with respective gear engaging mechanisms (not shown) provided in the lower portion of the transmission 10. The shift forks 25 and the gear engaging mechanisms are also conventional in the art.

The components of the transmission 10 thus far described constitute the basic structure of the main section of the transmission 10, which provides a predetermined number of speed reduction gear ratios between the input and output shafts thereof (not shown). In the illustrated embodiment, the first shift rail 20 is provided for shifting between sixth and seventh gear ratios, the second shift rail 21 is provided for shifting between fourth and fifth gear ratios, the third shift rail 22 is provided for shifting between second and third gear ratios, and the fourth shift rail 23 is provided for shifting between reverse and first gear ratios. Thus, the illustrated main section of the transmission 10 is an eight speed transmission (seven forward gear ratios and one reverse gear ratio). However, it will be appreciated that this invention may be used on transmissions having a greater or lesser number of shift rails and gear ratios.

The transmission 10 further includes an enlarged bell housing 30 which is attached to the forward end of the transmission case 11 by a plurality of threaded fasteners 31 or other means. The bell housing 30 is generally hollow in shape and is provided to protectively enclose portions of a conventional clutch (not shown) connected between an engine or other source of rotational power and the transmission 10. The bell housing 30 includes an interior wall 32 which closes the open forward end of the transmission case 11 to protectively enclose the various components of the transmission 10. An opening 33 is formed through the upper portion of the interior wall 32 of the bell housing.

A shift cylinder assembly, indicated generally at 50, is provided for selectively effecting the longitudinal movement of the shift rails 20, 21, 22, and 23. The shift is cylinder assembly 50 includes a housing 51 having a pair of outwardly extending flange portions 52 formed thereon. A pair of apertures 52a is formed through each of the flange portions 52. Respective threaded fasteners 53 extend through each of the apertures 52a to secure the housing 51 to the interior wall 32 of the bell housing 30. Thus, the housing 51 of the shift cylinder assembly 50 is fixed in position relative to the other components of the transmission 10.

Figure 3:
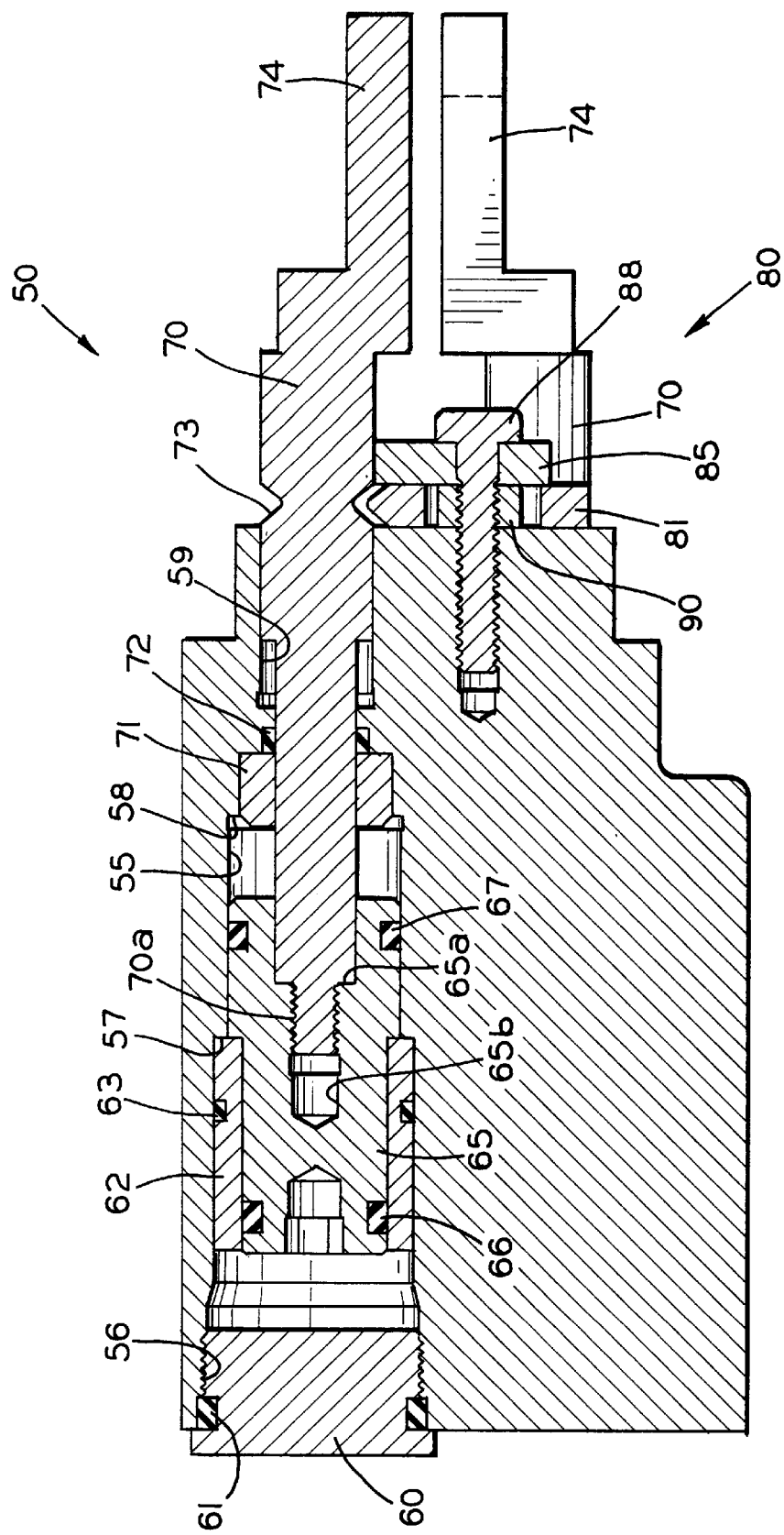
FIG. 3 is a sectional elevational view of the shift cylinder assembly and interlock mechanism illustrated in FIGS. 1 and 2.

Referring to FIG. 3, a plurality of longitudinally extending openings 55 are formed through the housing 51 of the shift cylinder assembly 50. Each of the openings 55 has an internally threaded portion 56 located at the forward end of the shift cylinder assembly 50. Each of the openings 55 further includes a first internal shoulder 57, a second internal shoulder 58, and a rearward end 59. The purposes of the first and second internal shoulders 57 and 58 will be explained below. Each of the openings 55 functions as a cylinder for a hydraulic shifting mechanism which is provided for each of the shift rails 20, 21, 22, and 23 contained within the transmission 10. Thus, one opening 55 is preferably provided for each of the shift rails 20, 21, 22, and 23 contained within the transmission 10. Inasmuch as the openings 55 themselves, as well as the hydraulic shifting mechanisms contained therein are identical for each of the shift rails 20, 21, 22, and 23, the structure of only one of such openings 55 and its associated hydraulic shifting mechanism will be explained in detail.

A threaded plug 60 is provided to close the forward end of the opening 55. If desired, an O-ring 61 or other sealing structure may be disposed within or near the internally threaded portion 56 so as to provide a fluid-tight seal. An outer piston 62 is disposed within the opening 55 adjacent to the plug 60. The outer piston 62 is hollow and cylindrical in shape and may include an O-ring 63 or other sealing structure to provide a fluid-tight seal between the outer surface thereof and the inner surface of the opening 55. As will be explained in detail below, the outer piston 62 is longitudinally movable between a first rearward position, wherein a rearward end of the outer piston 62 abuts the first internal shoulder 57 of the opening 55, and a second forward position, wherein a forward end of the outer piston 62 abuts the plug 60.

An inner piston 65 is also disposed within the opening 55 and includes a forward end portion which extends concentrically within the outer piston 62. The inner piston 65 is cylindrical in shape and may include an O-ring 66 or other sealing structure to provide a fluid-tight seal between the outer surface of the forward end thereof and the inner surface of the inner piston 62. The inner piston 65 may further include an O-ring 67 or other sealing structure to provide a fluid-tight seal between the outer surface thereof and the inner surface of the opening 55 formed through the shift cylinder assembly 50. As will be explained in detail below, the inner piston 65 is longitudinally movable between a first forward position, wherein an external shoulder 65*a* formed on the inner piston 65 abuts the rearward end of the outer piston 62, and a second rearward position, wherein the external shoulder 65*a* formed on the inner piston 65 is spaced apart from the rearward end of the outer piston 62.

A piston rod 70 is also disposed within the opening 55 and includes a forward threaded end portion 70*a* which is threaded into a corresponding bore 65*b* formed in the rearward end of the inner piston 65. Thus, the piston rod 70 is connected to the inner piston 65 for longitudinal movement therewith. The piston rod 70 extends rearwardly through a bushing 71 which is disposed within the opening 55 adjacent to the rearward end of the shift cylinder assembly 50. The bushing 71, which is provided to support the piston rod 70 for longitudinal movement, is preferably press fit within the opening 55 so as to be fixed in position relative thereto. An O-ring ring 72 or other sealing structure may be provided adjacent to the bushing 71 so as to provide a fluid-tight seal between the outer surface of the piston rod 70 and the inner surface of the opening 55. An annular recess 73 is formed about the piston rod 70 adjacent to the rearward end thereof for a purpose which will be explained in detail below.

Figure 2:
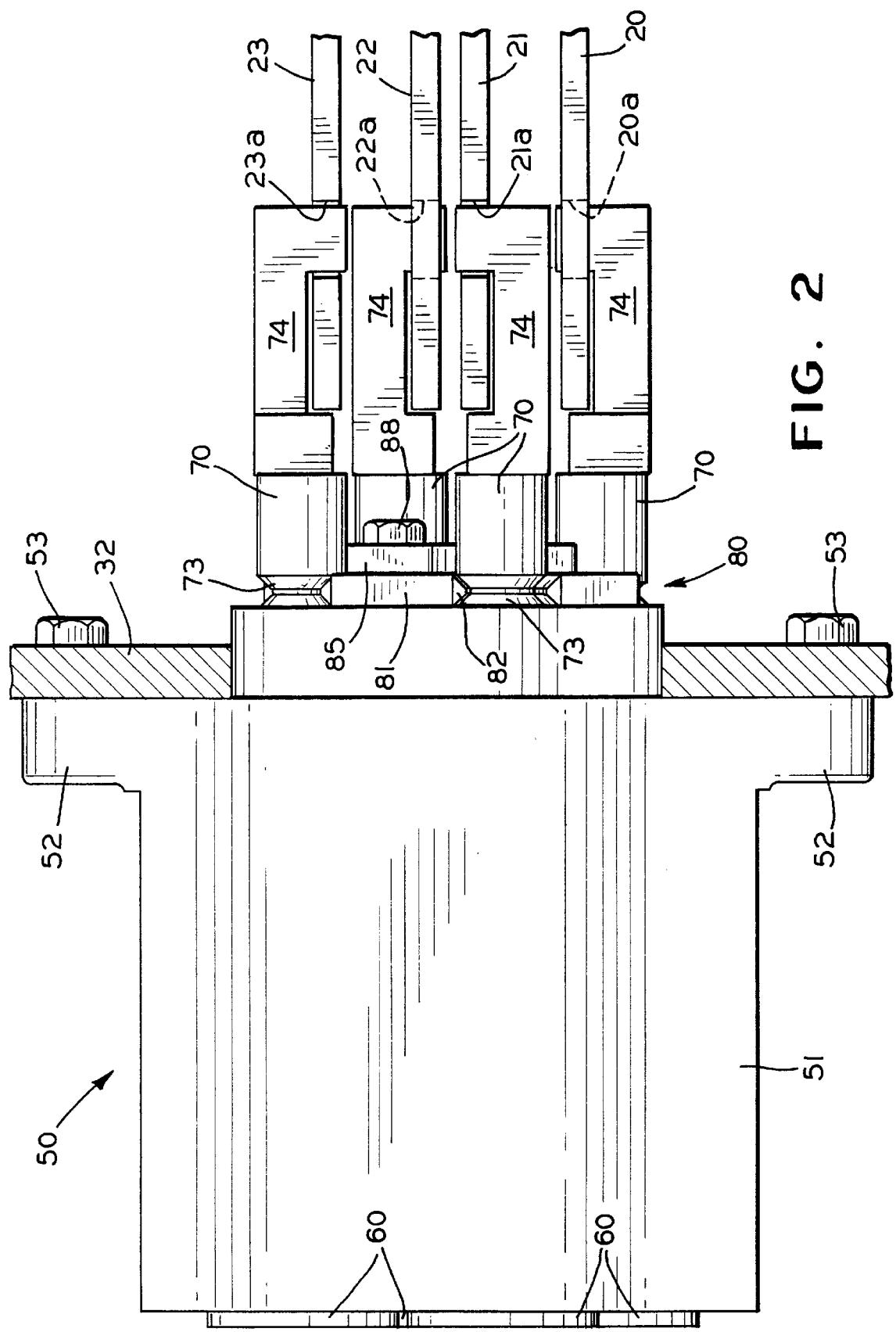
FIG. 2 is an enlarged top plan view of the shift cylinder assembly and interlock mechanism illustrated in FIG. 1.

The rearward end of the piston rod 70 extends outwardly from the housing 51 of the shift cylinder assembly 50 and terminates in a generally L-shaped end portion 74. The size and shape of the end of the L-shaped end portion 74 of the piston rod 70 corresponds generally to the size and shape of the notch 20*a* formed in the shift rail 20. Thus, as best shown in FIG. 2, the end of the L-shaped end portion 74 of the piston rod 70 extends into cooperation with the notch 20*a* formed in the lower surface of the shift rail 20. As a result, the shift rail 20 engages the piston rod 70 for movement therewith. Similarly, the ends of the L-shaped end portions 74 of the other piston rods 70 extend into cooperation with the notches 21*a*, 22*a*, and 23*a* formed in the other shift rails 21, 22, and 23. Consequently, the other shift rails 21, 22, and 23 are also connected for movement with the other piston rods 70.

Referring back to FIG. 1, it can be seen that a first plurality of fluid ports 75, 76, and 77 are formed in the housing 51 of the shift cylinder assembly 50. These fluid ports 75, 76, and 77 communicate with forward, intermediate, and rearward portions of the opening 55 formed through the housing 50, respectively. When it is desired to move the shift rail 20 to the central neutral position illustrated in FIG. 3, pressurized fluid (such as air) is supplied to the forward and rearward fluid ports 75 and 77, respectively, while the intermediate fluid port 76 is vented to the atmosphere. As a result, the outer piston 62 is moved rearwardly into abutment with the first internal shoulder 57 provided within the opening 55. At the same time, the inner piston 65 is moved forwardly into abutment with the outer piston 62. Thus, the inner piston 65, the piston rod 70, and the shift rail 20 are moved to the central neutral position illustrated in FIG. 3.

When it is desired to move the shift rail 20 to the forward position (toward the left when viewing FIG. 3) to engage a first gear ratio, pressurized fluid is supplied to the rearward fluid port 77, while the forward fluid port 75 is vented to the atmosphere. As a result, the outer piston 62 is moved forwardly into abutment with the plug 60. At the same time, the inner piston 65 is moved forwardly into abutment with the outer piston 62. Thus, the inner piston 65, the piston rod 70, and the shift rail 20 are moved forwardly from the illustrated central neutral position to engage a first gear ratio. Conversely, when it is desired to move the shift rail 20 to the rearward position (toward the right when viewing FIG. 3) to engage a second gear ratio, pressurized fluid is supplied to the forward fluid port 75, respectively, while the rearward fluid port 77 is vented to the atmosphere. As a result, the outer piston 62 is moved rearwardly into abutment with the first internal shoulder 57 provided within the opening 55. At the same time, the inner piston 65 is moved rearwardly into abutment with the bushing 71. Thus, the inner piston 65, the piston rod 70, and the shift rail 20 are moved rearwardly from the illustrated central neutral position to engage a second gear ratio. Similar fluid ports 75, 76, and 77 are formed in the housing 51 of the shift cylinder assembly 50 to effect longitudinal movement of the other shift rails 21, 22, and 23 in a similar manner.

Figure 5:
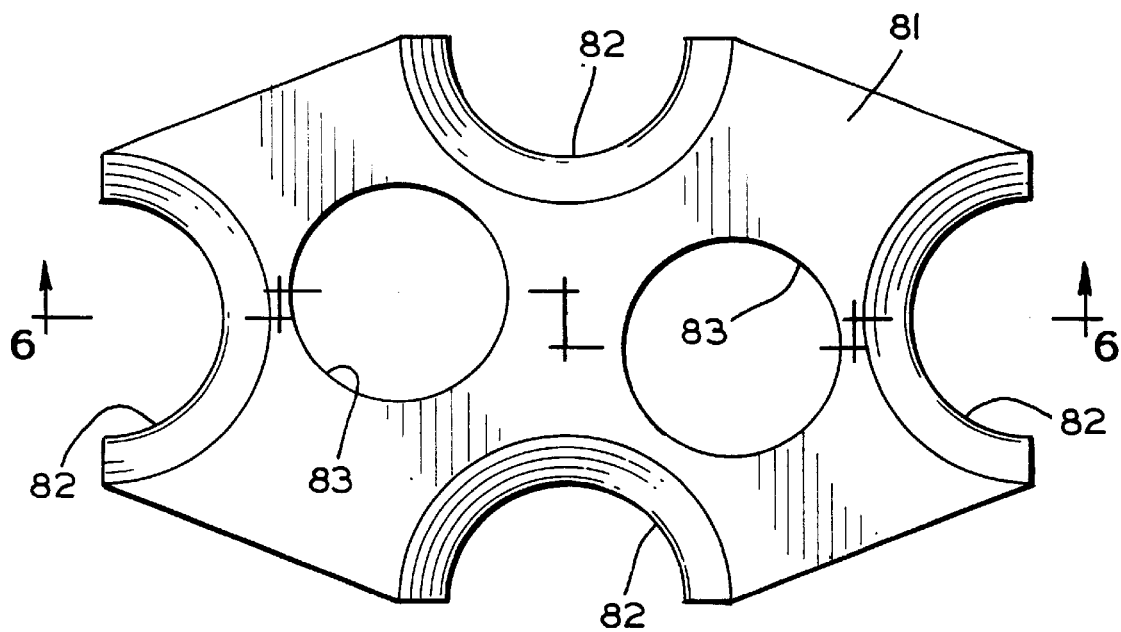
FIG. 5 is an enlarged elevational view of an interlock plate for the interlock mechanism illustrated in FIGS. 1 through 4.
Figure 6:
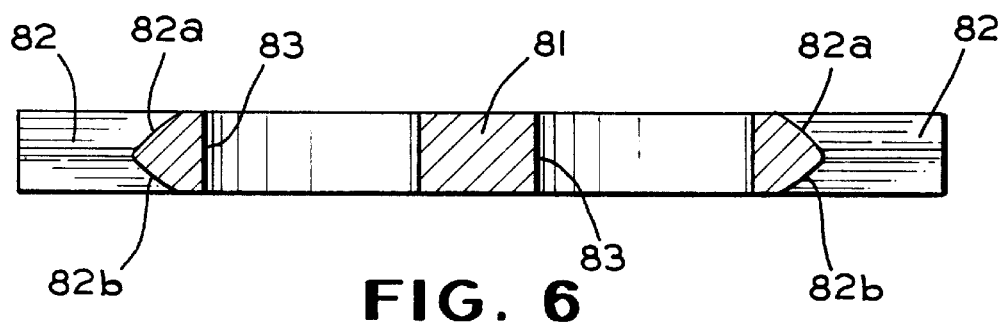
FIG. 6 is a sectional elevational view of the interlock plate taken along line 6—6 of FIG. 5.

An interlock mechanism, indicated generally at 80, is provided to insure that only one of the shift rails 20, 21, 22, and 23 can be moved out of the central neutral position to a gear engaging position at any given point in time. The interlock mechanism 80 includes an interlock plate 81 which is disposed adjacent to the rearward end of the housing 51 of the shift cylinder assembly 50. The structure of the interlock plate 81 is illustrated in detail in FIGS. 5 and 6. As shown therein, the interlock plate 81 is flat and generally trapezoidal in shape, having a plurality of arcuate cut-outs 82 formed therein. Each of the cut-outs 82 has tapered upper and lower surfaces 82*a* and 82*b* so as to define a curved side surface having a rounded profile, as best shown in FIG. 6. Preferably, one cut-out 82 is provided for each of the piston rods 70. Thus, in the illustrated embodiment, four of such cut-outs 82 are provided in the interlock plate 81. However, a greater or lesser number of such cut-outs 82 may be provided if desired. The interlock plate 81 further has a pair of relatively large apertures 83 formed therethrough. The purpose of the apertures 83 will be explained below.

Figure 7:
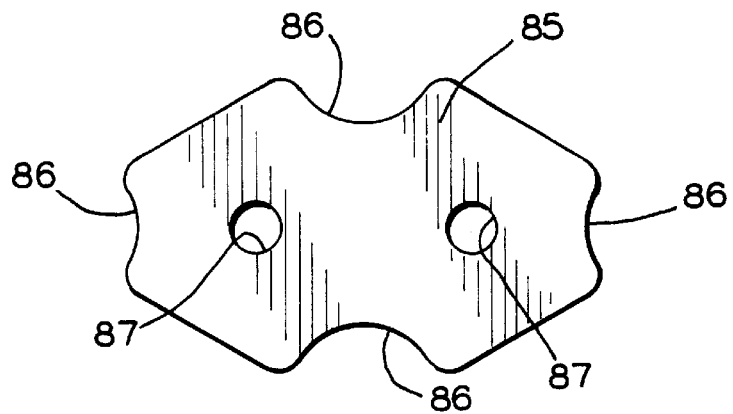
FIG. 7 is an enlarged elevational view of a backing plate for the interlock mechanism illustrated in FIGS. 1 through 4.

A backing plate 85 is provided for retaining the interlock plate 81 adjacent to the rearward end of the housing 51 of the shift cylinder assembly 50. The structure of the backing plate 85 is illustrated in detail in FIG. 7. As shown therein, the backing plate 85 is flat and generally trapezoidal in shape, having a plurality of arcuate cut-outs 86 formed therein. As with the interlock plate 81, the backing plate 85 preferably has one cut-out 86 formed therein for each of the piston rods 70. Thus, in the illustrated embodiment, four of such cut-outs 86 are provided in the backing plate 85. However, a greater or lesser number of such cut-outs 86 may be provided if desired. The backing plate 85 further has a pair of relatively small apertures 87 formed therethrough.

Figure 4:
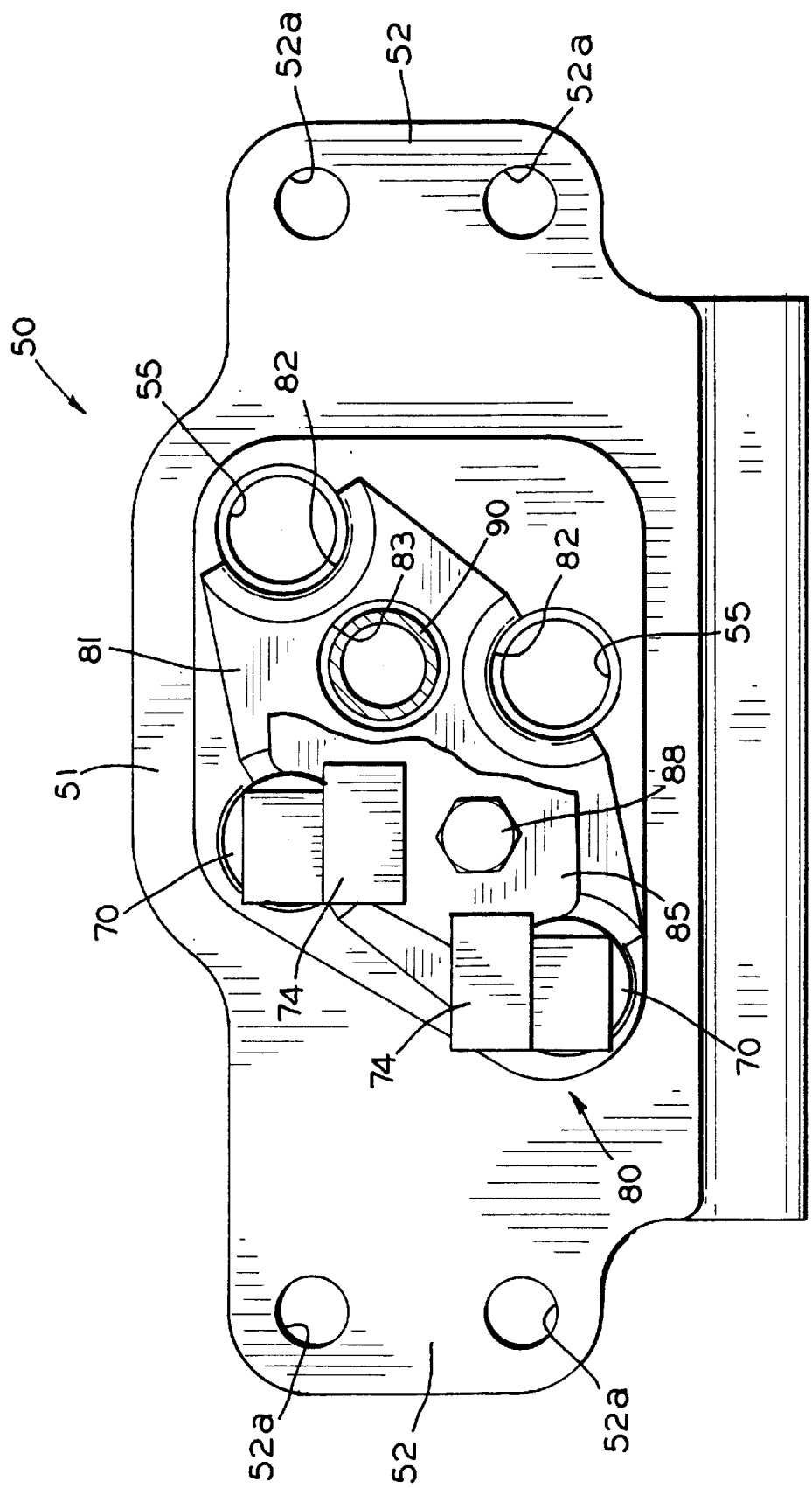
FIG. 4 is an end elevational view, partially broken away, of the shift cylinder assembly and interlock mechanism illustrated in FIG. 3.

A pair of threaded fasteners 88 are provided for retaining the interlock plate 81 and the backing plate 85 adjacent to the rearward end of the housing 51 of the shift cylinder assembly 50. The threaded fasteners 88 extend through the relatively small apertures 87 formed through the backing plate 85 and through respective bushings 90 (see FIGS. 3 and 4) disposed within the relatively large apertures 83 formed through the interlock plate 81 into threaded engagement with the housing 51 of the shift cylinder assembly 50. The bushings 90 are hollow and cylindrical in shape and are sized to function as spacers for allowing limited free movement of the interlock plate 81 relative to the backing plate 85 and the shift cylinder assembly 50. To accomplish this, the bushings 90 are formed having a longitudinal length which is slightly longer than the longitudinal thickness of the interlock plate 81. As a result, when the threaded fasteners 88 are tightened, the bushings 90 define a longitudinally extending space between the backing plate 85 and the rearward end of the housing 51 which is slightly larger than the interlock plate 85 disposed within that space. Accordingly, free movement of the interlock plate 85 is not inhibited by either the backing plate 85 or the housing 51. Furthermore, the bushings 90 are formed having an outer diameter which is somewhat smaller than the inner diameter defined by the relatively large openings 83 formed through the interlock plate 81, as best shown in FIG. 4. As a result, the interlock plate 81 is capable of moving in any direction relative to the backing plate 88 and the housing 51, limited only by the relative sizes of the outer diameter of the bushings 90 and the inner diameter defined by the relatively large openings 83 formed through the interlock plate 81. The relationship between the thickness of the interlock plate 81 and the longitudinal length of the bushings 90, as well as the relationship of the inner diameter of the relatively large openings 83 formed through the interlock plate 81 and the outer diameter of the bushings 90, will vary with the design of the particular transmission 90 in which they are used.

When the interlock mechanism 80 is assembled and all of the shift rails 20, 21, 22, and 23 are in their central neutral positions, the cut-outs 82 of the interlock plate 81 are aligned with and extend partially within the annular recesses 73 formed on the shift rods 20, 21, 22, and 23, as best shown in FIG. 3. When, for example, the shift rail 20 is moved longitudinally out of the central neutral position into one of its gear engaging positions, the associated recess 73 is moved out of alignment with the cut-out 82 of the interlock plate 81, and the inner surface of the cut-out 82 is engaged by the outer surface of the piston rod 70. As a result, the interlock plate 81 is moved laterally such that the side surfaces of the other three cut-outs 82 are moved further into the associated annular recesses 73 formed in the other three shift rails 21, 22, and 23. If an attempt is made to move any of such other shift rails 21, 22, and 23 longitudinally out of the central neutral position, the cut-outs 82 of the interlock plate 81 engage the sides of the annular recesses 73. Consequently, the interlock plate 81 positively prevents more than one of the shift rails 20, 21, 22, and 23 from being moved out of the central neutral position at any given point in time.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. An interlock mechanism for a vehicle transmission having a plurality of movable shift rails for selecting and engaging a desired gear ratio between an input shaft and an output shaft, said interlock mechanism comprising:
    a housing;
    an interlock plate defining a thickness and having an opening formed therethrough defining an inner diameter, said interlock plate having a surface which is adapted to selectively engage and lock the plurality of shift rails;
    a bushing disposed within said opening formed through said interlock plate, said bushing defining a length which is slightly longer than said thickness of said interlock plate, said bushing further defining an outer diameter which is slightly smaller than said inner diameter of said opening, for allowing lateral movement of said interlock plate relative to said bushing,
    a backing plate having an aperture formed therethrough; and
    a fastener extending through said aperture of said backing plate and through said bushing disposed within said opening formed through said interlock plate into engagement with said housing to allow limited free movement of said interlock plate in any direction.

2. The interlock mechanism defined in claim 1 wherein said interlock plate has a pair of openings formed therethrough, each of which defines an inner diameter.

3. The interlock mechanism defined in claim 2 wherein a bushing is disposed within each of said openings formed through said interlock plate.

4. The interlock mechanism defined in claim 3 wherein each of said bushings defines a length which is slightly longer than said thickness of said interlock plate.

5. The interlock mechanism defined in claim 3 wherein said backing plate has a pair of apertures formed therethrough.

6. The interlock mechanism defined in claim 5 wherein a fastener extends through each of said apertures of said backing plate and through each of said bushings disposed within said openings formed through said interlock plate into engagement with said housing.

7. The interlock mechanism defined in claim 1 wherein said interlock plate is flat and generally trapezoidal in shape.

8. The interlock mechanism defined in claim 1 wherein said interlock plate surface comprises a plurality of cut-outs formed in said interlock plate which are adapted to selectively engage and lock the plurality of shift rails.

9. The interlock mechanism defined in claim 8 wherein each of the cut-outs has tapered upper and lower surfaces so as to define a curved side surface having a rounded profile.

10. A transmission comprising:
    a case containing an input shaft, an output shaft, a plurality of meshing gears, and a plurality of shift rails, each of said shift rails being supported for movement between a neutral position, wherein said output shaft is not connected to said input shaft, and a gear engaging position, wherein said output shaft is connected through said meshing gears to said input shaft;
    a shift cylinder assembly for selectively moving said shift rails between said neutral and said gear engaging positions; and
    an interlock mechanism including a housing, an interlock plate defining a thickness and having an opening formed therethrough defining an inner diameter, said interlock plate having a surface which is adapted to selectively engage and lock the plurality of shift rails, a bushing disposed within said opening formed through said interlock plate, said bushing defining a length which is slightly longer than said thickness of said interlock plate, said bushing further defining an outer diameter which is slightly smaller than said inner diameter of said opening, for allowing lateral movement of said interlock plate relative to said bushing, a backing plate having an aperture formed therethrough, and a fastener extending through said aperture of said backing plate and through said bushing disposed within said opening formed through said interlock plate into engagement with said housing to allow limited free movement of said interlock plate in any direction.

11. The interlock mechanism defined in claim 10 wherein said interlock plate has a pair of openings formed therethrough, each of which defines an inner diameter.

12. The interlock mechanism defined in claim 11 wherein a bushing is disposed within each of said openings formed through said interlock plate.

13. The interlock mechanism defined in claim 12 wherein each of said bushings defines a length which is slightly longer than said thickness of said interlock plate.

14. The interlock mechanism defined in claim 12 wherein said backing plate has a pair of apertures formed therethrough.

15. The interlock mechanism defined in claim 14 wherein a fastener extends through each of said apertures of said backing plate and through each of said bushings disposed within said openings formed through said interlock plate into engagement with said housing.

16. The interlock mechanism defined in claim 10 wherein said interlock plate is flat and generally trapezoidal in shape.

17. The interlock mechanism defined in claim 10 wherein said interlock plate surface comprises a plurality of cut-outs formed in said interlock plate which are adapted to selectively engage and lock the plurality of shift rails.

18. The interlock mechanism defined in claim 17 wherein each of the cut-outs has tapered upper and lower surfaces so as to define a curved side surface having a rounded profile.

\* \* \* \* \*